United States Patent
Kotani et al.

(10) Patent No.: US 6,350,345 B1
(45) Date of Patent: Feb. 26, 2002

(54) CURABLE RESIN COMPOSITION

(75) Inventors: Jun Kotani; Masato Kusakabe; Hiroshi Iwakiri, all of Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/584,075

(22) Filed: Jun. 1, 2000

(30) Foreign Application Priority Data

Jun. 1, 1999 (JP) .............................. 11-153320
Feb. 8, 2000 (JP) ......................... 2000-030370

(51) Int. Cl.$^7$ ................... C09J 183/04; C09J 133/08
(52) U.S. Cl. ................. 156/329; 528/901; 528/31; 528/14; 525/106; 156/327
(58) Field of Search .................. 525/106; 528/901, 528/31, 14; 156/327, 329

(56) References Cited

U.S. PATENT DOCUMENTS

| | | |
|---|---|---|
| 4,593,068 A | 6/1986 | Hirose et al. |
| 5,109,064 A | 4/1992 | Wakabayashi et al. |
| 5,650,467 A | 7/1997 | Suzuki et al. |
| 6,150,464 A | * 11/2000 | Medsker et al. |

FOREIGN PATENT DOCUMENTS

| | | | |
|---|---|---|---|
| EP | 525769 A1 | * 2/1993 | |
| JP | 0108946 A | 10/1983 | ........... C08L/71/02 |
| JP | 0295330 A | 10/1987 | .............. C09J/3/14 |
| JP | 3-263478 | 11/1991 | |
| JP | 7-62219 | 3/1995 | |
| JP | 7-90171 | 4/1995 | |

OTHER PUBLICATIONS

Abstract—JP11012455A (Sekisui Chem Ind Co Ltd) Jan. 19, 1999. An 19990148715: Plasdoc–Central Patens Index–Basic Abstract Journal, Section A., vol. 1999, XP002148979, Derwent Publications Ltd., London.

Glossary of Basic Terms in Polymer Science, Pure and Applied Chemistry: vol. 68, No. 12, 1996, pp. 2287–2311, XP000933983.

* cited by examiner

*Primary Examiner*—Robert Dawson
*Assistant Examiner*—Kuo-Liang Peng
(74) *Attorney, Agent, or Firm*—Sughrue Mion, PLLC

(57) ABSTRACT

This invention has its object to provide a curable resin compositions useful as contact adhesives with a prolonged tack retention period, without affecting the final bond strength. This invention is related to a A curable resin composition which comprises (I) a reactive silicon group-containing polyether oligomer, (II) a copolymer comprising a molecular chain substantially composed of one or more acrylate ester monomer units and/or methacrylate ester monomer units and (III) an accelerator.

17 Claims, No Drawings

CURABLE RESIN COMPOSITION

FIELD OF THE INVENTION

The present invention relates to a curable resin composition useful as a contact adhesive. The term "contact adhesive" as used herein means an adhesive capable of adhesion under pressure after standing for a certain period of time following application thereof to an adherend.

PRIOR ART

The so-called solvent type adhesives comprising a natural rubber or a diene compound polymer such as synthetic rubber, together with additives, such as a tackifier resin, a plasticizer and an antioxidant, as homogeneously dissolved in an organic solvent (the solid concentration being 20 to 35%) have so far been widely used as contact adhesives. Since, however, a large amount of an organic solvent is used in such solvent type adhesives, not only the cost of the solvent arises but also the organic solvent must be evaporated and removed, which raises problems from the viewpoint of working environment, protection against disasters and pollution. For solving such problems and providing adhesives comparable in performance to the conventional solvent type adhesives, solvent-free contact adhesives have been proposed in which a modified silicone polymer is used, as disclosed in Japanese Kokai Publication Hei-03-263478 and Japanese Kokai Publication Hei-07-258535.

However, the contact adhesive in which the modified silicone polymer disclosed in Japanese Kokai Publication Hei-03-263478 is used has problems in that it takes a fairly long time for a sufficient extent of tack to enable lamination to develop and that it is poor in workability because of its high viscosity. Japanese Kokai Publication Hei-07-258535 discloses a curable composition comprising a reactive silicon group-containing oxyalkylene polymer, an acrylic copolymer and a curing catalyst. However, it does not disclose the introduction of a hydrocarbon group into such a reactive silicon group-containing oxyalkylene polymer at a position close to the reactive silicon group. In Japanese Kokai Publication Hei-07-258535, it is proposed that a contact adhesive capable of developing tack in a short time, allowing laminating over a long period and showing good workability be prepared by the method disclosed therein. However, the period during which tack is retained is not longer than an hour, hence cannot be said to be sufficient for workers to effect lamination. The measures so far taken for prolonging the tack retention period comprise adjusting the cure rate by changing the catalyst species, increasing or decreasing the catalyst amount, and/or changing the terminal reactive silicon group content, among others. However, the prior art measures have a problem in that when the tack retention period is prolonged by adjusting the cure rate, the final bond strength decreases accordingly. Thus, it is an object of the present invention to provide a curable resin composition with a prolonged tack retention period without affecting the final bond strength.

SUMMARY OF THE INVENTION

The present inventors made intensive investigations in an attempt to solve the problems mentioned above and, as a result, found that when an alkyl group is introduced into a reactive silicon group-containing polyether oligomer at a position close to the reactive silicon group, the reactivity of the reactive silicon group is indirectly reduced and the tack retention period is prolonged without affecting the final bond strength. Based on this finding, the present invention has now been completed.

Thus, in a first aspect thereof, the present invention relates to a curable resin composition which comprises (I) a reactive silicon group-containing polyether oligomer, (II) a copolymer comprising a molecular chain substantially composed of one or more acrylate ester monomer units and/or methacrylate ester monomer units, and (III) an accelerator, said reactive silicon group-containing polyether oligomer having, within the molecule thereof, a partial structure represented by the general formula (1):

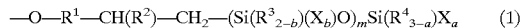
—O—R$^1$—CH(R$^2$)—CH$_2$—(Si(R$^3$$_{2-b}$)(X$_b$)O)$_m$Si(R$^4$$_{3-a}$)X$_a$  (1)

wherein R$^1$ represents a divalent organic group of 1 to 20 carbon atoms containing at least one constituent element selected from the group consisting of hydrogen, oxygen and nitrogen, R$^2$ represents an alkyl group of 1 to 10 carbon atoms, R$^3$ and R$^4$ may be the same or different and each represents an alkyl group of 1 to 20 carbon atoms, an aryl group of 6 to 20 carbon atoms or an aralkyl group of 7 to 20 carbon atoms or a triorganosiloxy group of the formula (R')$_3$SiO—, in which R' is a monovalent hydrocarbon group of 1 to 20 carbon atoms and the three R' groups may be the same or different and, where there are two or more R$^3$ or R$^4$ groups, they may be the same or different; X represents a hydroxyl group or a hydrolyzable group and, where there are two or more X groups, they may be the same or different; a represents 0, 1, 2 or 3, b represents 0, 1 or 2, m represents an integer of 0 to 19, and the b's in the m —(Si(R$^3$$_{2-b}$)(X$_b$)—O)—groups maybe the same or different, provided that the condition a+Σb≧1 is satisfied.

In a preferred embodiment, this invention is related to the above curable resin composition wherein R$^1$ in component (I) is CH$_2$.

In a further preferred embodiment, this invention is related to the above curable resin composition wherein R$^2$ in component (I) is CH$_3$.

In a further preferred embodiment, this invention is related to the above curable resin composition wherein component (I) is a reactive silicon group-containing polyether oligomer having a partial structure represented by the formula:

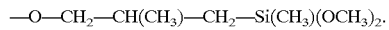
—O—CH$_2$—CH(CH$_3$)—CH$_2$—Si(CH$_3$)(OCH$_3$)$_2$.

In another preferred embodiment, this invention is related to the above curable resin composition wherein component (I) is a reactive silicon group-containing polyether oligomer obtainable by reacting a polyether oligomer having an unsaturated bond introduced therein of the general formula (2):

—O—R$^1$—C(CH$_3$)=CH$_2$  (2)

wherein R$^1$ is as defined above, with a reactive silicon group-containing compound represented by the general formula (3):

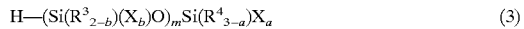
H—(Si(R$^3$$_{2-b}$)(X$_b$)O)$_m$Si(R$^4$$_{3-a}$)X$_a$  (3)

wherein R$^3$, R$^4$, a, b, m and X are as defined above, in an oxygen-containing atmosphere in the presence of a catalyst and a sulfur compound.

In a further preferred embodiment, this invention is related to the above curable resin composition wherein component (I) is a reactive silicon group-containing polyether oligomer having a partial structure represented by the formula:

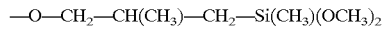
—O—CH$_2$—CH(CH$_3$)—CH$_2$—Si(CH$_3$)(OCH$_3$)$_2$ as obtainable by reacting a polyether oligomer having an unsaturated bond introduced therein of the formula:

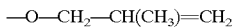
—O—CH$_2$—CH(CH$_3$)=CH$_2$ with a reactive silicon group-containing compound of the formula:

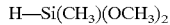
H—Si(CH$_3$)(OCH$_3$)$_2$ in an oxygen-containing atmosphere in the presence of a catalyst and a sulfur compound.

In another preferred embodiment, this invention is related to the above curable resin composition
  wherein component (II) is a copolymer comprising a molecular chain substantially composed of (a) acrylic and/or methacrylic ester monomer units having a hydrocarbon group of 1 to 8 carbon atoms and (b) acrylic and/or methacrylic ester monomer units having a hydrocarbon group of 10 or more carbon atoms.

In a further preferred embodiment, this invention is related to the above curable resin composition wherein component (II) is a copolymer having a silicon group crosslinkable under siloxane bond formation.

DETAILED DESCRIPTION OF THE INVENTION

In the following, the present invention is described in detail. The reactive silicon group-containing polyether oligomer to be used as component (I) according to the present invention may be any polyether-based oligomer comprising a polyether as its main chain and, on a side chain or at a terminal, at least one structure represented by the general formula (1)

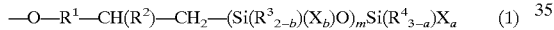
—O—R$^1$—CH(R$^2$)—CH$_2$—(Si(R$^3_{2-b}$)(X$_b$)O)$_m$Si(R$^4_{3-a}$)X$_a$     (1)

wherein R$^1$ represents a divalent organic group of 1 to 20 carbon atoms containing at least one constituent element selected from the group consisting of hydrogen, oxygen and nitrogen, R$^2$ represents an alkyl group of 1 to 10 carbon atoms, R$^3$ or R$^4$ may be the same or different and each represents an alkyl group of 1 to 20 carbon atoms, an aryl group of 6 to 20 carbon atoms or an aralkyl group of 7 to 20 carbon atoms or a triorganosiloxy group of the formula (R')$_3$SiO—, in which R' is a monovalent hydrocarbon group of 1 to 20 carbon atoms and the three R' groups may be the same or different, and where there are two or more R$^3$ or R$^4$ groups, they may be the same or different; X represents a hydroxyl group or a hydrolyzable group and, where there are two or more X groups, they may be the same or different; a represents 0, 1, 2 or 3, b represents 0, 1 or 2, and the b's in the m —(Si(R$^3_{2-b}$)(X$_b$)—O)—groups may be the same or different, provided that the condition a+Σb≧1 is satisfied.

R$^1$, which is a divalent organic group of 1 to 20 carbon atoms containing at least one constituent element selected from the group consisting of hydrogen, oxygen and nitrogen, includes, among others, —CH$_2$—, —C$_2$H$_4$—, —C$_3$H$_6$—, —C$_4$H$_8$—, —C$_5$H$_{10}$—, —C$_6$H$_4$—, —C$_6$H$_{12}$—, —C$_7$H$_{14}$—, —C$_8$H$_{16}$—, —C$_9$H$_{18}$—, —C$_{10}$H$_{20}$—, —CH(CH$_3$)—, —CH$_2$—CH(CH$_3$)—, —CH$_2$—CH(CH$_3$)—CH$_2$—, —C$_2$H$_4$—CH(CH$_3$)—, —CH$_2$—C$_6$H$_4$—, —CH$_2$—C$_6$H$_4$—CH$_2$—, —C$_2$H$_4$—C$_6$H$_4$—, —C(O)—, —C(O)—CH$_2$—, —C(O)—C$_6$H$_4$—, —C(O)—NH—, —C(O)—NH—CH$_2$—, —C(O)—NH—C$_6$H$_4$—, —C(O)—O—, —C(O)—O—CH$_2$—, —C(O)—O—C$_6$H$_4$— and like groups. Among these, —CH$_2$—, —C$_2$H$_4$—, —CH$_2$—CH(CH$_3$)—, —C(O)— and —C(O)—NH— are preferred because of ease of synthesis and —CH$_2$— is most preferred because of ready raw material availability.

As specific examples of R$^2$, there may be mentioned, among others, alkyl groups such as methyl, ethyl and propyl, and cycloalkyl groups such as cyclohexyl. Among them, methyl is particularly preferred.

As specific examples of R$^3$ and R$^4$, there may be mentioned alkyl groups such as methyl and ethyl, cycloalkyl groups such as cyclohexyl, aryl groups such as phenyl, aralkyl groups such as benzyl, and triorganosiloxy groups of the formula (R')$_3$SiO—in which R' is methyl or phenyl, for instance. Methyl is most preferred as R$^3$, R$^4$ or R'.

Among the groups represented by X, the hydrolyzable group is not particularly restricted but may be any of the so far known hydrolyzable groups. Specifically, there may be mentioned, among others, a hydrogen or halogen atom, and an alkoxy, acyloxy, ketoximate, amino, amido, acid amido, amino-oxy, mercapto or alkenyloxy group. Among these, alkoxy groups such as methoxy, ethoxy, propoxy and iso-propoxy are preferred because of their mild hydrolyzability and ease of handling thereof.

One to three hydroxyl and/or hydrolyzable groups may be bound to one silicon atom and the sum (a+Σb) is preferably equal to 1 to 5. When a reactive silicon group has two or more hydroxyl and/or hydrolyzable groups, the two or more groups may be the same or different.

The number of silicon atoms in each reactive silicon group may be 1 or 2 or more and, in the case of a reactive silicon group including silicon atoms bound together via siloxane bonding, for instance, the number of silicon atoms may be up to about 20.

A reactive silicon group represented by the following general formula (5):

—Si(R$^4_{3-a}$)X$_a$     (5)

wherein R$^4$, X and a are as defined above, is preferred because of its ready availability.

It is more preferred that R$^4$ be methyl, X be methoxy and a be 2 or 3.

Ten molecular chain terminals of the polyether oligomer preferably have, on an average, at least one, more preferably 0.5 to 5 from the viewpoint of curability, still more preferably 0.8 to 2 reactive silicon groups. It is particularly preferred that the number of reactive silicon groups per terminal be 0.9 to 1, since, then, cured products showing good rubber elasticity behavior can be obtained.

The average number of reactive silicon groups per polymer molecule may be one or more. For securing sufficient curability, however, said average number is preferably 1.5 to 4.

The reactive silicon group-containing polyether oligomer, namely component (I), may comprise one single species or a combination of two or more different species.

Specifically, it is preferred that component (I) be a reactive silicon group-containing polyether oligomer having a partial structure represented by the formula:

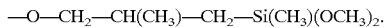
—O—CH$_2$—CH(CH$_3$)—CH$_2$—Si(CH$_3$)(OCH$_3$)$_2$.

Although the molecular weight of the reactive silicon group-containing polyether oligomer, namely component (I), is not restricted, a number average molecular weight of 1,000 to 100,000 is preferred. When the number average molecular weight is less than 1,000, the reactive silicon group-containing polyether oligomer will give brittle cured products. When said molecular weight exceeds 100,000, the functional group concentration becomes too low, which results in a decreased rate of curing, and at the same time, the viscosity of the polymer becomes excessively high, which renders handling of the polymer difficult. For attaining desirable mechanical properties, a number average molecular weight of 10,000 to 50,000 is especially preferred.

The "number average molecular weight of the polyether oligomer" is herein defined as the number average molecular weight determined by directly determining the terminal group concentrations through hydroxyl value determination according to JIS K 1557 and titrimetric analysis based on the principle of iodine value determination as described in JIS K 0070 and making a calculation with the structure of the polyether oligomer taken into consideration. It is also possible, by constructing a working curve for the relation between the polystyrene-equivalent molecular weight determined by GPC, which is a generalized method for relative number average molecular weight determination, and the above terminal group-based molecular weight, to determine the number average molecular weight in question by converting the molecular weight obtained by GPC to the corresponding terminal group-based molecular weight.

The main chain structure of the component (I) polyether oligomer has, as a repeating unit, a structure represented by —R—O— (in which R is a divalent organic group of 1 to 20 carbon atoms containing at least one constituent atom selected from the group consisting of hydrogen, oxygen and nitrogen atoms). Said oligomer may be a homopolymer in which all repeating units are the same or a copolymer including two or more repeating unit species. The main chain may have a branched structure.

As specific examples of R, there may be mentioned —$CH_2CH_2$—, —$CH(CH_3)CH_2$—, —$CH(C_2H_5)CH_2$—, —$C(CH_3)_2CH_2$—, —$CH_2CH_2CH_2CH_2$—, and the like, among which —$CH(CH_3)CH_2$— is particularly preferred.

For obtaining component (I) to be used according to the present invention, a polyether obtained by subjecting a substituted or unsubstituted epoxy compound containing 2 to 12 carbon atoms, for example an alkylene oxide, specifically ethylene oxide, propylene oxide, α-butylene oxide, β-butylene oxide, hexene oxide, cyclohexene oxide, styrene oxide, α-methylstyrene oxide, or an alkyl, allyl or aryl glycidyl ether, specifically methyl glycidyl ether, ethyl glycidyl ether, isopropyl glycidyl ether, butyl glycidyl ether, allyl glycidyl ether or phenyl glycidyl ether, to ring opening polymerization in the presence of a dihydric or polyhydric alcohol or a hydroxyl-containing oligomer, such as ethylene glycol, propylene glycol, butanediol, hexamethylene glycol, methallyl alcohol, hydrogenated bisphenol A, neopentyl glycol, polybutadiene diol, diethylene glycol, triethylene glycol, polyethylene glycol, polypropylene glycol, polypropylene triol, polypropylene tetraol, dipropylene glycol, glycerol, trimethylolmethane, trimethylolpropane or pentaerythritol, as an initiator-and in the presence of a catalyst can be used. Usable as the catalyst for this polymerization are alkali catalysts such as KOH and NaOH, acidic catalysts such as trifluoroborane etherate, aluminoporphyrin-metal complex catalysts, cobalt zinc cyanide-glyme complex catalysts, like double metal cyanide complex catalysts and other catalysts already known for such polymerization. While the use of a double metal cyanide complex catalyst is preferred because of causing little side reactions, any other catalysts may also be employed.

Further, the main chain skeleton of the polyether oligomer can also be obtained by chain extension of a hydroxyl-terminated polyether oligomer with a bifunctional or multifunctional alkyl halide, such as $CH_2Cl_2$ or $CH_2Br_2$, in the presence of a basic compound such as KOH, NaOH, $KOCH_3$ or $NaOCH_3$.

For producing component (I) from such a hydroxyl-containing polyether oligomer, any of known methods may be employed, for example the method comprising introducing an unsaturated bond into a hydroxyl-containing polyether oligomer and then reacting the product with a reactive silicon group-containing compound.

The method of introducing an unsaturated bond into a hydroxyl-containing polyether oligomer may comprise ether bond, ester bond, urethane bond, carbonate bond or like bond formation. In the case of unsaturated group introduction through ether bond formation, for instance, the hydroxyl group of the polyether oligomer is converted to the metaloxy form —OM (M being Na or K), followed by reacting with an organohalogen compound represented by the general formula (6):

$$H_2C=C(R^2)—R^1—Y \qquad (6)$$

wherein $R^1$ is a divalent organic group of 1 to 20 carbon atoms containing at least one constituent atom selected from the group consisting of hydrogen, oxygen and nitrogen atoms, $R^2$ is an alkyl group of 1 to 10 carbon atoms and Y is a halogen atom) to give an unsaturated group-containing polyether. As specific examples of the unsaturated group-containing compound of general formula (6), there may be mentioned $H_2C=C(CH_3)—CH_2—Cl$, $H_2C=C(CH_3)—CH_2—Br$ and the like, among which $H_2C=C(CH_3)—CH_2—Cl$ is particularly preferred from the viewpoint of reactivity, raw material availability and ease of synthesis.

It is also possible to effect unsaturated group introduction using an isocyanate compound, carboxylic acid or epoxy compound having a $H_2C=C(CH_3)—CH_2—$ or like group.

The reaction of the unsaturated bond-containing polyether oligomer with the reactive silicon group-containing compound can be carried out, for example, in the manner of hydrosilylation in the presence of a catalyst.

The reactive silicon group-containing compound to be used in this hydrosilylation reaction may have, within its molecule, one or more silicon groups with said hydroxyl and/or hydrolyzable group being bound thereto, and one or more Si—H groups within its molecule. Typical examples are represented by the general formula (3):

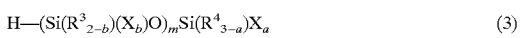
$$H—(Si(R^3{}_{2-b})(X_b)O)_mSi(R^4{}_{3-a})X_a \qquad (3)$$

wherein $R^3$, $R^4$, a, b, m and X are as defined above referring to general formula (1) given above.

Specifically, there may be mentioned halogenated silanes such as trichlorosilane, methyldichlorosilane, dimethylchlorosilane, phenyldichlorosilane, trimethylsiloxymethylchlorosilane and 1,1,3,3-tetramethyl-1-bromodisiloxane; alkoxysilanes such as trimethoxysilane, triethoxysilane, methyldiethoxysilane, methyldimethoxysilane, phenyldimethoxysilane, trimethylsiloxymethylmethoxysilane and trimethylsiloxydiethoxysilane; acyloxysilanes such as methyldiacetoxysilane, phenyldiacetoxysilane, triacetoxysilane, trimethylsiloxymethylacetoxysilane and trimethylsiloxydiacetoxysilane; ketoximatesilanes such as bis(dimethylketoximate) methylsilane, bis(cyclohexylketoximate)methylsilane, bis(diethylketoximate)trimethylsiloxysilane, bis(methylethylketoximate)methylsilane and tris(acetoximate) silane; alkenyloxysilanes such as methylisopropenyloxysilane; and so forth. Among these, alkoxysilanes are especially preferred and, among alkoxy groups, methoxy is particularly preferred.

Reactive silicon group-containing compounds represented by the general formula (7):

$$H—Si(R^4{}_{3-a})X_a \qquad (7)$$

wherein $R^4$, X and a are as defined above, are preferred because of their ready availability.

As specific examples of $R^3$ and $R^4$ in the above general formulas (3) and (7), there may be mentioned, among others, alkyl groups such as methyl and ethyl, cycloalkyl groups such as cyclohexyl, aryl groups such as phenyl, aralkyl groups such as benzyl, and triorganosiloxy groups of the formulas $(R')_3SiO$—in which $R'$ is methyl or phenyl, for instance. Methyl is particularly preferred as $R^3$, $R^4$ and/or $R'$.

In a preferred embodiment of the above hydrosilylation reaction, a polyether oligomer, introduced an unsaturated bond therein and represented by the general formula (2):

$$—O—R^1—C(CH_3)=CH_2 \qquad (2)$$

wherein $R^1$ is as defined above,
is reacted with a reactive silicon group-containing compound represented by the general formula (3):

$$H—(Si(R^3{}_{2-b})(X_b)O)_m Si(R^4{}_{3-a})X_a \qquad (3)$$

wherein $R^3$, $R^4$, a, b, m and X are as defined above referring to general formula (1) given above, in an oxygen-containing atmosphere in the presence of a catalyst and a sulfur compound to give a reactive silicon group-containing polyether oligomer, which is a preferred one. More preferred is a polyether oligomer having a structure represented by the formula:

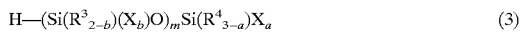

$$—O—CH_2—CH(CH_3)—CH_2—Si(CH_3)(OCH_3)_2$$

as obtained by reacting a polyether oligomer, introduced an unsaturated bond therein and represented by the formula:

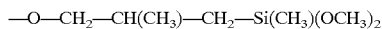

$$—O—CH_2—C(CH_3)=CH_2$$

with a reactive silicon group-containing compound of the formula:

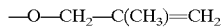

$$H—Si(CH_3)(OCH_3)_2$$

in an oxygen-containing atmosphere in the presence of a catalyst and a sulfur compound.

Effective as the catalyst for the hydrosilylation reaction between the polyether oligomer with an unsaturated bond introduced therein and the reactive silicon group-containing compound are metal complex catalysts in which the metal is selected from among group VIII transition metal elements such as platinum, rhodium, cobalt, palladium and nickel. Usable are, for instance, $H_2PtCl_6 \cdot 6H_2O$, platinum-vinylsiloxane complexes, platinum-olefin complexes, Pt metal, $RhCl(PPh_3)_3$, $RhCl_3$, $Rh/Al_2O_3$, $RuCl_3$, $IrCl_3$, $FeCl_3$, $PdCl_2 \cdot 2H_2O$, $NiCl_2$ and like compounds. From the viewpoint of reactivity in hydrosilylation, either platinum-vinylsiloxane complexes or platinum-olefin complexes are especially preferred. The term "platinum-vinylsiloxane complexes" as used herein collectively refers to those compounds containing a platinum atom and a siloxane, polysiloxane or cyclic siloxane having a vinyl group within its molecule as a ligand to the platinum atom. As specific examples of the ligand, there may be mentioned 1,1,3,3-tetramethyl-1,3-divinyldisiloxane (platinum-divinylsiloxane complex) and 1,3,5,7-tetravinyl-1,3,5,7-tetramethylcyclotetrasiloxane. As specific examples of the olefin ligand in the platinum-olefin complexes, there may be mentioned 1,5-hexadiene, 1,7-octadiene, 1,9-decadiene, 1,11-dodecadiene and 1,5-cyclooctadiene. Among such ligands, 1,9-decadiene is particularly preferred.

Such platinum-vinylsiloxane complexes and platinum-olefin complexes are disclosed in Japanese Kokoku Publication Hei-08-9006.

In addition to those mentioned above, $AlCl_3$, $TlCl_4$ and the like may also be used as hydrosilylation catalysts.

Although the amount of the catalyst is not restricted, it is generally preferred that the platinum catalyst be used in an amount of $10^{-1}$ to $10^{-8}$ mole, more preferably $10^{-3}$ to $10^{-6}$ mole, per mole of the alkenyl group. When the amount of the catalyst is below the range mentioned above, the hydrosilylation reaction may fail to proceed to a sufficient extent. When the catalyst amount is excessive, problems may arise, namely the consumption of the catalyst may result in an increase in production cost and the residual catalyst amount in the product may increase.

The hydrosilylation reaction in the practice of the present invention is carried out generally at a temperature within the range of 10 to 150° C., preferably 20 to 120° C., more preferably 40 to 100° C. The hydrosilylation reaction can be carried out in the absence or presence of a solvent according to the necessity of reaction temperature adjustment and/or reaction system viscosity adjustment, among others. Generally, hydrocarbons, halogenated hydrocarbons, ethers and esters can be used as the solvent in the hydrosilylation reaction. Preferred among them are heptane, hexane, benzene, toluene, xylene, tetrahydrofuran and methylene chloride. In certain instances, a plasticizer or the like which does not affect the hydrosilylation reaction, for example a paraffin or α-methylstyrene oligomer, can also be used.

For promoting the hydrosilylation reaction, catalyst reactivation using oxygen (Japanese Kokai Publication Hei-08-283339) and addition of a sulfur compound are preferred. The addition of a sulfur compound contributes to reduce the production time without causing such problems as an increase in production cost as otherwise resulting from the use of an increased amount of the expensive platinum catalyst or necessity of removing the residual catalyst and thus contributes to increase the productivity. The sulfur compound includes, but is not limited to, elemental sulfur, thiols, sulfides, sulfoxides, sulfones and thioketones. Among them, sulfur is especially preferred. In adding a sulfur compound to the liquid reaction system, the sulfur compound is dissolved and mixed in advance with a portion of the reaction mixture or solvent, for instance. Then, the solution can be homogeneously dispersed in the whole reaction mixture. Thus, for example, the sulfur compound can be added following dissolution thereof in an organic solvent such as toluene, hexane or xylene.

The addition amount of the sulfur compound can be selected, for example, within the range of 0.1 to 10 moles per mole of the metal catalyst or of 0.002 to 0.1 mole per mole of the alkenyl group, or of 1 to 500 ppm on the whole reaction mixture weight basis. When the addition amount is too low, the effects of the present invention may not be fully produced in certain instances. When it is excessively high, the sulfur compound may reduce the catalyst activity or inhibit the reaction as the case may be. It is thus desirable to adequately select the addition amount.

In the hydrosilylation reaction in the production process according to the invention, the gaseous phase in the reactor may comprise an inert gas (e.g. nitrogen or helium) alone or oxygen or another gas. From the viewpoint of safety in handling inflammable gases, the hydrosilylation reaction may be carried out in the presence of an inert gas, such as nitrogen or helium, in the gaseous phase in the reactor. When the reaction is carried out in the presence of an inert gas in the gaseous phase in the reactor, however, the rate of reaction may decrease depending on the conditions of the hydrosilylation reaction system.

In the hydrosilylation reaction in the production process according to the invention, the hydrosilylation reaction can be safely promoted in the presence of oxygen by selecting the oxygen concentration in the gaseous phase in the reactor at an amount such that the formation of an explosive mixture composition can be avoided. The oxygen concentration in the gaseous phase in the reactor may be 0.5 to 10%, for instance.

For preventing the polyether oligomer, reaction solvent and/or plasticizer in the system, among others, from being oxidized by oxygen, the hydrosilylation reaction may be carried out in the presence of an antioxidant. Usable as the antioxidant are phenolic antioxidants having a radical chain inhibitor function, for example, 2,6-di-tert-butyl-p-cresol, 2,6-di-tert-butylphenol, 2,4-dimethyl-6-tert-butylphenol, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3-(3,5-di-tert-butyl-4-hydroxyphenyl)propionato]methane, 1,1,3-tris(2-methyl-4-hydroxy-5-tert-butylphenyl)butane and the like. Amine type antioxidants such as phenyl-β-naphthylamine, α-naphthylamine, N,N'-di-sec-butyl-p-phenylenediamine, phenothiazine and N,N'-diphenyl-p-phenylenediamine may also be used as like radical chain inhibitors. The antioxidant is not limited to those mentioned above, however.

Further, in the practice of the present invention, the hydrolyzable group X in the silyl group obtained may be converted to another hydrolyzable group Y. Particularly when the group X is a halogen atom, a hydrogen halide having a strong irritating odor is generated in the step of curing by moisture, so that said group is preferably converted to another hydrolyzable group. The hydrolyzable functional group, which is the target of conversion, includes alkoxy, acyloxy, ketoximate, amido, acid amido, aminoxy, mercapto and like groups. Various methods are available for converting a halogen functional group to such hydrolyzable functional groups. For conversion to an alkoxy group, for instance, there may specifically be mentioned the method comprising reacting the halogen functional group with (1) an alcohol or phenol, such as methanol, ethanol, 2-methoxyethanol, sec-butanol, tert-butanol and phenol, (2) the sodium, potassium or lithium alkoxide or phenoxide or the like of an alcohol or phenol, (3) an orthoformate ester such as methyl orthoformate and ethyl orthoformate or (4) an epoxy compound such as ethylene oxide, propylene oxide and allyl glycidyl ether, among others. Particularly when a reaction system comprising a combination of (1) and (3), namely an alcohol or phenol and an orthoformate ester, or a reaction system comprising a combination of (1) and (4), namely an alcohol or phenol and an epoxy compound, is used, the reaction can be carried out with ease and favorable results can be obtained. For conversion to an acyloxy group, there may specifically be mentioned the method comprising reacting the halogen functional group with (1) a carboxylic acid such as acetic acid and propionic acid, (2) an acid anhydride such as acetic anhydride, or (3) the sodium, potassium or lithium salt of a carboxylic acid, among others. For conversion to an aminoxy group, there may specifically be mentioned the method comprising reacting the halogen functional group with (1) a hydroxylamine such as N,N-dimethylhydroxylamine, N,N-diethylhydroxylamine, N,N-methylphenylhydroxylamine and N-hydroxypyrrolidine or (2) the sodium, potassium or lithium salt of a hydroxylamine, among others. For conversion to an amido group, there may specifically be mentioned the method comprising reacting the halogen functional group with (1) a primary or secondary amine such as N,N-dimethylamine, N,N-diethylamine, N-methylphenylamine and pyrrolidine or (2) the sodium, potassium or lithium salt of a primary or secondary amine, among others. For conversion to an acid amide, there may specifically be mentioned the method comprising reacting the halogen functional group with (1) an acid amide having at least one hydrogen atom on the nitrogen atom, such as acetamide, formamide or propionamide, or (2) the sodium, potassium or lithium salt of such acid amide, for instance. By using a reaction system in which a ketoxime such as acetoxime or methyl ethyl ketoxime or a mercaptan such as N-octylmercaptan and t-butylmercaptan is combined with an orthoformate ester or an epoxy compound, partial conversion to the corresponding ketoximate or mercapto group can be effected, with the remaining groups being converted to the corresponding orthoformate ester- or epoxy compound-derived alkoxyl groups. Conversion to another hydrolyzable functional group is applicable not only to the case of halogen functional groups as mentioned above but also to various other hydrolyzable functional groups.

Referring to the copolymer having a molecular chain substantially composed of one or more acrylic and/or methacrylic ester monomer unit species, namely component (II) to be used according to the present invention (hereinafter such copolymer is referred to as copolymer (II)), the acrylic ester monomer unit species includes a wide variety of those known in the art as derived, for example, from methyl acrylate, ethyl acrylate, n-propyl acrylate, n-butyl acrylate, isobutyl acrylate, t-butyl acrylate, n-hexyl acrylate, 2-ethylhexyl acrylate, decyl acrylate, undecyl acrylate, lauryl acrylate, tridecyl acrylate, myristyl acrylate, cetyl acrylate, stearyl acrylate, bephenyl acrylate and biphenyl acrylate. The methacrylic ester monomer unit species includes a wide variety of those known in the art as derived, for example, from methyl methacrylate, ethyl methacrylate, n-propyl methacrylate, n-butyl methacrylate, isobutyl methacrylate, t-butyl methacrylate, n-hexylmethacrylate, 2-ethylhexylmethacrylate, decylmethacrylate, undecylmethacrylate, laurylmethacrylate, tridecyl methacrylate, myristyl methacrylate, cetyl methacrylate, stearyl methacrylate, behenyl methacrylate and biphenyl methacrylate.

The molecular chain of copolymer (II) is substantially composed of one or more acrylic and/or methacrylic ester monomer unit species. The phrase "substantially composed of such monomer unit species" means that the acrylic and/or methacrylic ester monomer unit species occurring in copolymer (II) account for more than 50%, preferably not less than 70%, of all the monomer units occurring therein.

Among various combinations of these monomers, a copolymer (hereinafter, copolymer (II)-a) having a molecular chain substantially composed of (a) acrylic and/or methacrylic ester monomer units having a hydrocarbon group of 1 to 8 carbon atoms and (b) acrylic and/or methacrylic ester monomer units having a hydrocarbon group of 10 or more carbon atoms is preferred from the viewpoint of compatibility and stability. The monomer unit species (a), namely an acrylic and/or methacrylic ester monomer unit species having a hydrocarbon group of 1 to 8 carbon atoms, in said copolymer is represented by the general formula (8):

$$CH_2=C(R^5)COOR^6 \qquad (8)$$

wherein $R^5$ represents a hydrogen atom or a methyl group and $R^6$ represents a hydrocarbon group of 1 to 8 carbon atoms.

As $R^6$ in the above general formula (8), there may be mentioned alkyl groups containing 1 to 8 carbon atoms, such as methyl, ethyl, propyl, n-butyl, t-butyl and 2-ethylhexyl, among which those containing 1 to 4 are preferred and those containing 1 or 2 carbon atoms are more preferred. The monomer represented by general formula (8) may comprise one single species or two or more species.

The acrylic and/or methacrylic ester unit species having a hydrocarbon group of 10 or more carbon atoms, which forms monomer units (b), is represented by the general formula (9):

$$CH_2=C(R^5)COOR^7 \qquad (9)$$

wherein $R^5$ is as defined above and $R^7$ represents a hydrocarbon group of 10 or more carbon atoms.

As $R^7$ in the above general formula (9), there may be mentioned, among others, long chain alkyl groups containing 10 or more carbon atoms, generally 10 to 30, preferably 10 to 20 carbon atoms, such as lauryl, tridecyl, cetyl, stearyl and groups containing 22 carbon atoms, as well as biphenyl groups. The monomer represented by general formula (9) may comprise a single species or a combination of monomers having, for example, hydrocarbon groups of 12 and 13 carbon atoms, respectively.

The molecular chain of copolymer (II)-a is substantially composed of monomer unit species (a) and (b). The phrase "substantially composed of monomer unit species (a) and (b)" means that the monomer unit species (a) and (b) occurring in copolymer (II)-a account for more than 50%, preferably not less than 70%, of all the monomer units occurring therein. When the content of the monomer units (a) and (b) is less than 50%, the compatibility of polyether oligomer (I) with copolymer (II)-a will be poor and there is a tendency toward turbidity and, at the same time, the adhesion characteristics tend to lower.

The ratio between monomer units (a) and monomer units (b) is preferably 95:5 to 40:60 by weight, more preferably 90:10 to 60:40 by weight. When the above ratio is higher than 95:5, the compatibility will become decreased. A ratio lower than 40:60 will be disadvantageous from the cost viewpoint.

Copolymer (II) may additionally contain another monomer unit species copolymerizable with the acrylic and/or methacrylic ester monomer unit species. As the other monomer unit species, there maybe mentioned, for example, monomer units derived from acrylic acids such as acrylic acid and methacrylic acid; amido group-containing monomers such as acrylamide, methacrylamide, N-methylolacrylamide and N-methylolmethacrylamide, epoxy group-containing monomers such as glycidyl acrylate and glycidyl methacrylate, and amino group-containing monomers such as diethylaminoethyl acrylate, diethylaminoethyl methacrylate and aminoethyl vinyl ether; and, further, acrylonitrile, styrene, α-methylstyrene, alkyl vinyl ethers, vinyl chloride, vinyl acetate, vinyl propionate, ethylene and so forth.

From the viewpoint of contact adhesiveness, copolymer (II) preferably has a relatively high softening point, preferably a softening point not lower than 0° C., more preferably not lower than 20° C. When copolymer (II) has a low softening point, it is also possible to use a tackifier resin for improving the contact adhesiveness.

While the molecular weight of the copolymer (II) component is not restricted, a number average molecular weight of 500 to 100,000 as expressed in terms of polystyrene equivalent in GPC is preferred. A number average molecular weight of 1,000 to 10,000 is more preferred from the viewpoint of ease of handling, for instance.

Copolymer (II) can be prepared by a conventional method of vinyl polymerization. The method of obtaining it includes, but is not particularly limited to, solution and bulk polymerization methods utilizing a radical reaction. After adding the monomers mentioned above, a radical initiator, a chain transfer agent and a solvent, for instance, the reaction is carried out generally at 50 to 150° C.

As examples of the radical initiator mentioned above, there may be mentioned azobisisobutyronitrile, benzoyl peroxide and the like and, as examples of the chain transfer agent, there may be mentioned mercaptans, such as n-dodecylmercaptan, tert-dodecylmercaptan and laurylmercaptan, and halogen-containing compounds. Preferred for use as the solvent are, for example, ethers, hydrocarbons, esters and like nonreactive solvents.

From the viewpoint of contact adhesiveness and final bond strength, it is preferred that copolymer (II) have a silicon-containing group crosslinkable under siloxane bond formation (hereinafter, such silicon-containing group is referred to as "reactive silicon group").

Various methods are available for introducing a reactive silicon group into copolymer (II). For example, there may be mentioned (A) the method comprising copolymerizing a polymerizable unsaturated bond- and reactive silicon group-containing compound with monomers (a) and (b), (B) the method comprising copolymerizing a polymerizable unsaturated bond- and reactive functional group (hereinafter referred to as group Y)-containing compound (e.g. acrylic acid) with monomers (a) and (b) and then reacting the resulting copolymer with a compound having a reactive silicon group and a functional group (hereinafter referred to as group Y') reactive with group Y (e.g. an isocyanato and $-Si(OCH_3)_3-$ containing compound), (C) the method comprising copolymerizing monomers (a) and (b) in the presence of a reactive silicon group-containing mercaptan as a chain transfer agent, (D) the method comprising copolymerizing monomers (a) and (b) using a reactive silicon group-containing azobisnitrile compound or disulfide compound as an initiator, and (E) the method comprising polymerizing monomers (a) and (b) in the manner of living radical polymerization and introducing a reactive silicon group into the polymer at molecular terminals thereof, without any particular restriction thereto. It is also possible to employ any arbitrary combination of methods (A) to (E). For example, methods (A) and (C) may be combined: thus, it is possible to employ the method comprising copolymerizing a polymerizable unsaturated bond- and reactive silicon group-containing compound with monomers (a) and (b) in the presence of a reactive silicon group-containing mercaptan as a chain transfer agent.

The polymerizable unsaturated bond- and reactive silicon group-containing compound referred to above under (A) is represented by the general formula (10):

$$CH_2=C(R^5)COCR^8-[Si(R^2{}_{2-b})(X_b)O]_mSi(R^4{}_{3-a})X_a \qquad (10)$$

wherein $R^5$ is as defined above, $R^8$ represents a divalent alkylene group of 1 to 6 carbon atoms with $R^3$, $R^4$, X, a, b and m are as defined above,
or the general formula (11):

$$CH_2=C(R^5)-[Si(R^3{}_{2-b})(X_b)O]_mSi(R^4{}_{3-a})X_a \qquad (11)$$

wherein $R^3$, $R^4$, $R^5$, X, a, b and m are as defined above.

As the group $R^8$ in the above general formula (10), there may be mentioned ones having 1 to 6 carbon atoms, preferably ones having 1 to 4 carbon atoms, such as methylene, ethylene and propylene.

As specific examples of the hydrolyzable group X in formula (10) or (11), there may be mentioned, among others, halogen atoms, a hydrogen atom, alkoxy groups, acyloxy groups, ketoximate groups, amino groups, amido groups, aminoxy groups, mercapto groups, alkenyloxy groups and the like. Among them, alkoxy groups, such as methoxy and ethoxy, are preferred because of their mild hydrolyzability. The monomer represented by general formula (10) or (11) may comprise either one single species or two or more species.

As the polymerizable unsaturated bond- and reactive silicon group-containing compound represented by general formula (10) or (11), there may be mentioned, for example, γ-methacryloxyalkylpolyalkoxysilane such as γ-methacryloxypropyltrimethoxysilane, γ-methacryloxypropylmethyldimethoxysilane and γ-methacryloxypropyltriethoxysilane, γ-acryloxyalkylpolyalkoxysilane such as γ-acryloxypropyltrimethoxysilane, γ-acryloxypropylmethyldimethoxysilane and γ-acryloxypropyltriethoxysilane, and vinylalkylpolyalkoxysilanes such as vinyltrimethoxysilane, vinylmethyldimethoxysilane and vinyltriethoxysilane.

As examples of group Y and group Y' mentioned above under (B), there may be mentioned various combinations of groups. For example, group Y may be an amino, hydroxyl or carboxylic acid group, while group Y' may be an isocyanato group. In another example, group Y may be an allyl group and group Y' may be a silicon hydride group (H—Si), as described in Japanese Kokai Publication Sho-54-36395, Japanese Kokai Publication Hei-01-272654, and Japanese Kokai Publication Hei-02-214759. In this case, group Y can bind to group Y' in the manner of hydrosilylation in the presence of a group VIII transition metal.

As the reactive silicon group-containing mercaptan to be used as a chain transfer agent as mentioned above under (C), there may be mentioned γ-mercaptopropyltrimethoxysilane, γ-mercaptopropylmethyldimethoxysilane and γ-mercaptopropyltriethoxysilane, among others. It is also possible, as described in Japanese Kokai Publication Sho-59-78222, to copolymerize monomers (a) and (b) in the presence of a bifunctional radicai-polymerizable compound and an alkoxysilyl-containing mercaptan as a chain transfer agent.

As the reactive silicon group-containing azobisnitrile or disulfide compound mentioned above under (D), there may be mentioned those alkoxysilyl-containing azobisnitrile compounds or alkoxysilyl-containing disulfide compounds which are described in Japanese Kokai Publication Sho-60-23405 and Japanese Kokai Publication Sho-62-70405, for instance.

As for the method mentioned above under (E), reference may be made to Japanese Kokai Publication Hei-09-272714, for instance.

Furthermore, there may be mentioned the method comprising using a reactive silicon group-containing mercaptan and a reactive silicon group-containing radical polymerization initiator combinedly, as described in Japanese Kokai Publication Sho-59-168014 and Japanese Kokai Publication Sho-60-228516, for instance.

The number of reactive silicon groups contained in copolymer (II) is not particularly restricted. From the viewpoint of effects on bond strength and cost, however, it is preferred that each molecule of copolymer (II) have, on an average, not less than 0.1 but not more than 2.0, more preferably not less than 0.5 and not more than 1.5, reactive silicon groups.

As regards the mixing ratio between polyether oligomer (I) and copolymer (II) in the composition of the present invention, it is preferred, from the viewpoint of characteristic improving effects, that the composition contain 10 to 200 parts by weight, more preferably 20 to 160 parts by weight, of copolymer (II) per 100 parts by weight of polyether oligomer (I). Generally, an adequate mixing ratio is to be selected according to the intended use and performance characteristics.

The accelerator, which is component (III) to be used according to the invention, is not particularly restricted but may be any of silanol condensation catalysts in general use and capable of promoting the reaction of the reactive silicon group. As specific examples of such accelerators, there may be mentioned, among others, organotin compounds, organic titanate compounds, organoaluminum compounds, organozirconium compounds, amine compounds, acidic phosphate esters, reaction products from acidic phosphate esters and amine compounds, saturated or unsaturated polybasic carboxylic acids or anhydrides thereof, salts or like reaction products from carboxylic acid compounds and amine compounds, and lead octylate. As the above tin compounds, there may be mentioned dibutyltin dilaurate, dibutyltin maleate, dibutyltin diacetate, dioctyltin maleate, dibutyltin phthalate, stannous octoate, stannous naphthenate, stannous stearate, stannous versatate, reaction products from dibutyltin oxide and phthalate esters, chelate compounds such as dibutyltin diacetylacetonate and the like, and dibutyltin oxide. As the organic titanate compounds, there may be mentioned titanate esters such as tetrabutyl titanate, tetrapropyl titanate, tetraisopropyl titanate and triethanolamine titanate, and chelate compounds such as titanium tetraacetylacetonate, among others. As the organoaluminum compounds, there may be mentioned aluminum trisacetylacetonate, aluminum tris(ethyl acetoacetate), diisopropoxyaluminum ethyl acetoacetate and the like. As the zirconium compounds, there may be mentioned zirconium tetraisopropoxide, zirconium tetrabutoxide and zirconium tetraacetylacetonate, among others. As the amine compounds, there may be mentioned butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, and 1,8-diazabicyclo[5.4.0]undecene-7 (DBU), among others. Salts of these amines with carboxylic acids or the like may also be used. As other examples, there may be mentioned low-molecular-weight polyamide resins obtained from an excess of a polyamine and a polybasic acid and reaction products from an excess of a polyamine and an epoxy compound. In addition, there may be mentioned organolead compounds such as lead octylate, organoiron compounds such as iron naphthenate, organovanadium compounds, bismuth salts such as bismuth-tris(2-ethylhexanoate) and bismuth tris (neodecanoate), and reaction products from an excess of an organic carboxylic acid and an organic amine. These accelerators may be used singly or two or more of them may be used in combination. Among these silanol condensation catalysts, organometallic compounds or combination systems comprising an organometallic compound and an amine compound are preferred from the viewpoint of curability.

Such an accelerator is used generally in an amount selected according to the intended use and performance characteristics. Preferably, it is used in an amount of 0.1 to 20, more preferably from the cost viewpoint 0.5 to 10 parts, per 100 parts by weight of the total of polyether oligomer component (I) and copolymer component (II).

To the contact adhesive in which the curable resin composition of the present invention is used, there maybe added, where necessary, a tackifier resin, filler, plasticizer, pigment, adhesion aid, silicon compound, ultraviolet absorber, antioxidant, light stabilizer, solvent and/or a like additive.

Any known filler can be used as the filler. Examples are heavy calcium carbonate, colloidal calcium carbonate, light calcium carbonate, magnesium carbonate, kaolin, talc, clay, bentonite, organicbentonite, silica, titaniumoxide, aluminum silicate, magnesium oxide, zinc oxide, carbon black, glass balloons, and the like. These fillers may be used singly or two or more of them may be used combinedly.

Any known plasticizer may be used as the plasticizer mentioned above. Examples are phthalate esters such as dioctyl phthalate and butyl benzyl phthalate, aliphatic carboxylic acid esters, nonaromatic dibasic acid esters, glycol esters and phosphate esters, as well as relatively high-molecular plasticizers such as polyesters from a dibasic acid and a dihydric alcohol, polypropylene glycol and derivatives thereof, polystyrenes, paraffins, chlorinated paraffins, epoxidized soybean oil, and the like. These plasticizers may be used either singly or in admixture.

For improving the adhesiveness, curability and/or storage stability, various aminosilanes or silicon compounds such as epoxysilanes may be added. As examples thereof, there may be mentioned, without any particular limitative meaning, vinyltrimethoxysilane, vinyltriethoxysilane, methyltrimethoxysilane, phenyltrimethoxysilane, diphenyldimethoxysilane, phenylmethyldimethoxysilane, dimethyldimethoxysilane, phenyltriethoxysilane, diphenyldiethoxysilane, phenylmethyldiethoxysilane, dimethyldiethoxysilane, γ-methacryloxypropyltrimethoxysilane, γ-methacryloxypropylmethyldimethoxysilane, γ-methacryloxypropyltriethoxysilane, γ-aminopropyltrimethoxysilane, γ-aminopropyltriethoxysilane, γ-aminopropylmethyldimethoxysilane, N-(β-aminoethyl)-γ-aminopropyltrimethoxysilane, N-(β-aminoethyl)-γ-aminopropyltriethoxysilane, N-(β-aminoethyl)-γ-aminopropylmethyldimethoxysilane, 1,3-diaminoisopropyltrimethoxysilane, γ-glycidoxypropyltrimethoxysilane, γ-glycidoxypropyltriethoxysilane, γ-glycidoxypropylmethyldimethoxysilane, β-(3,4-epoxycyclo-hexyl)ethyltrimethoxysilane and the like. These silicon compounds may be used singly or two or more of them may be used combinedly.

The solvent includes, but is not particularly limited to, nonreactive ones such as hydrocarbons, acetate esters, alcohols, ethers and ketones.

The method of preparing the contact adhesive in which the curable resin composition of the present invention, comprising component (I), component (II) and component (III), is used is not particularly restricted. Thus, for example, such an ordinary method may be employed that comprises mixing components (I), (II) and (III) together and kneading the mixture at ordinary temperature or with heating using a mixer, roll, kneader or the like, or dissolving the above components respectively in small amounts of an appropriate solvent and mixing the solutions together.

By adequately combining these components, it is possible to prepare the adhesive in the one component or two component form, or in the three or more component form as the case may be. The method of applying the adhesive is not restricted. The adhesive can be applied in the conventional manner using a spatula, roll or sprayer or the like. It is also possible to apply the adhesive directly from a container (e.g. tube, cartridge) in which the adhesive is stored.

As regards the method of adhesion, after application, the adhesive is allowed to stand in the air for a certain period of time, during which curing of the adhesive by moisture in the air proceeds, and tack is developed in the adhesive layer. On that occasion, heating and/or humidification may be made to promote tack development. Adhesion of adherends is conducted during the tack is retained in the adhesive layers.

The present invention can provide curable resin compositions useful as contact adhesives with a prolonged tack retention period, without affecting the final bond strength.

BEST MODE FOR CARRYING OUT THE INVENTION

The following specific examples illustrate the present invention in further detail. They are, however, by no means limitative of the scope of the invention.

SYNTHESIS EXAMPLE 1

Polyoxypropylene glycol with an average molecular weight of 10,000 as determined by terminal group analysis was prepared by polymerizing propylene oxide using polypropylene glycol as an initiator and zinc hexacyanocobaltate-glyme complex as a catalyst. Then, NaOMe in the form of a methanol solution was added in an amount of 1.2 equivalents per hydroxyl group of the above hydroxyl-terminated polyether oligomer, the methanol was distilled off, and 3-chloro-2-methyl-1-propene was further added to thereby convert the terminal hydroxyl group to a methallyl group. Then, 10 g of hexane was added to 500 g of the oligomer obtained and azeotropic dehydration was effected at 90° C., the hexane was distilled off under reduced pressure, and the vessel was purged with 8% $O_2/N_2$. To the vessel contents were added 25 µl of sulfur (1% (by weight) toluene solution) and 56 µl of platinum-divinyldisiloxane complex (3% (by weight as platinum) xylene solution), and 24.2 g DMS (dimethoxymethylsilane) was gradually added dropwise with stirring. After allowing the reaction to proceed at 90° C. for 5 hours, the unreacted DMS was distilled off under reduced pressure to give a reactive silicon group-containing polyoxypropylene polymer. By $^1$H-NMR analysis of the polymer obtained, it was confirmed that the terminal reactive silicon group introduction percentage was 98% (polymer A). Polymer A thus obtained had a number average molecular weight of about 10,000.

SYNTHESIS EXAMPLE 2

Polyoxypropylene glycol with an average molecular weight of 20,000 as determined by terminal group analysis was prepared by polymerizing propylene oxide using polypropylene glycol as an initiator and zinc hexacyanocobaltate-glyme complex as a catalyst. Then, NaOMe in the form of a methanol solution was added in an amount of 1.2 equivalents per hydroxyl group of the above hydroxyl-terminated polyether oligomer, the methanol was distilled off, and 3-chloro-2-methyl-1-propene was further added to thereby convert the terminal hydroxyl group to a methallyl group. Then, 10 g of hexane was added to 500 g of the oligomer obtained and azeotropic dehydration was effected at 90° C., the hexane was distilled off under reduced pressure, and the vessel was purged with 8% $O_2/N_2$. To the vessel contents were added 24 µl of sulfur (1% (by weight) toluene solution) and 54 µl of platinum-divinyldisiloxane complex (3% (by weight as platinum) xylene solution), and 11.5 g of DMS (dimethoxymethylsilane) was gradually added dropwise with stirring. After allowing the reaction to proceed at 90° C. for 10 hours, the unreacted DMS was distilled off under reduced pressure to give a reactive silicon group-containing polyoxypropylene polymer. By $^1$H-NMR analysis of the polymer obtained, it was confirmed that the terminal reactive silicon group introduction percentage was 98% (polymer B). Polymer B thus obtained had a number average molecular weight of about 20,000.

COMPARATIVE SYNTHESIS EXAMPLE 1

Polyoxypropylene glycol with an average molecular weight of 10,000 as determined by terminal group analysis was prepared by polymerizing propylene oxide using polypropylene glycol as an initiator and zinc hexacyanocobaltate-glyme complex as a catalyst. Then, NaOMe in the form of a methanol solution was added in an amount of 1.2 equivalents per hydroxyl group of the above hydroxyl-terminated polyether oligomer, the methanol was distilled off, and 3-chloro-1-propene was further added to thereby convert the terminal hydroxyl group to an allyl group. Then, 10 g of hexane was added to 500 g of the oligomer obtained and azeotropic dehydration was effected at 90° C., the hexane was distilled off under reduced pressure, and the vessel was purged with nitrogen. To the vessel contents was added 30 µl of platinum-divinyldisiloxane complex (3% (by weight as platinum) xylene solution), and 9.0 g of DMS (dimethoxymethylsilane) was gradually added dropwise with stirring. After allowing the reaction to proceed by heating the mixed solution at 90° C. for 2 hours, the unreacted DMS was distilled off under reduced pressure to give a reactive silicon group-containing polyoxypropylene polymer. By $^1$H-NMR analysis of the polymer obtained, it was confirmed that the terminal reactive silicon group introduction percentage was 82% (polymer C). Polymer C thus obtained had a number average molecular weight of about 10,000.

COMPARATIVE SYNTHESIS EXAMPLE 2

Polyoxypropylene glycol with an average molecular weight of 10,000 as determined by terminal group analysis was prepared by polymerizing propylene oxide using polypropylene glycol as an initiator and zinc hexacyanocobaltate-glyme complex as a catalyst. Then, NaOMe in the form of a methanol solution was added in an amount of 1.2 equivalents per hydroxyl group of the above hydroxyl-terminated polyether oligomer, the methanol was distilled off, and 3-chloro-1-propene was further added to thereby convert the terminal hydroxyl group to an allyl group. Then, 10 g of hexane was added to 500 g of the oligomer obtained and azeotropic dehydration was effected at 90° C., the hexane was distilled off under reduced pressure, and the vessel was purged with nitrogen. To the vessel contents was added 30 µl of platinum-divinyldisiloxane complex (3% (by weight as platinum) xylene solution), and 6.5 g of DMS (dimethoxymethylsilane) was gradually added dropwise with stirring. After allowing the reaction to proceed by heating the mixed solution at 90° C. for 2 hours, the unreacted DMS was distilled off to give a reactive silicon group-containing polyoxypropylene polymer. By $^1$H-NMR analysis of the polymer obtained, it was confirmed that the terminal reactive silicon group introduction percentage was 65% (polymer D). Polymer D thus obtained had a number average molecular weight of about 10,000.

SYNTHESIS EXAMPLE 3

To 43 g of toluene heated at 110° C. was added dropwise over 4 hours a solution of 2.0 g of azobisisobutyronitrile as a polymerization initiator in a mixture of 28 g of butyl acrylate, 46 g of methyl methacrylate, 20 g of stearyl methacrylate, 4.4 g of γ-methacryloxypropylmethyldimethoxysilane and 23 g of toluene. Then, polymerization was effected for 2 hours to give a copolymer (polymer E) with a solid concentration of 60% and a number average molecular weight (Mn) as determined by GPC (polystyrene equivalent) of 8,500.

SYNTHESIS EXAMPLE 4

To 43 g of toluene heated at 110° C. was added over 4 hours a mixture of 6.0 g of butyl acrylate, 66 g of methyl methacrylate, 13 g of stearyl methacrylate, 5.4 g of γ-methacryloxypropylmethyldimethoxysilane, 7.0 g of γ-mercaptopropylmethyldimethoxysilane and 23 g of toluene with 2.6 g of azobisisobutyronitrile dissolved therein as a polymerization initiator and, then, the polymerization was allowed to proceed for 2 hours to give a copolymer (polymer F) with a solid concentration of 60% and a number average molecular weight (Mn) of 2,200 as determined by GPC (polystyrene equivalent)

SYNTHESIS EXAMPLE 5

To 43 g of toluene heated at 110° C. was added dropwise over 4 hours a mixture of 32 g of butyl acrylate, 62 g of methyl methacrylate, 4.4 g of γ-methacryloxypropylmethyl-dimethoxysilane and 23 g of toluene with 2.0 g of azobi-sisobutyronitrile dissolved therein as a polymerization initiator, and the polymerization reaction was carried out for 2 hours to give a copolymer having a number, average molecular weight (Mn) of 8,400 as determined by GPC (polystyrene equivalent) with a solid concentration of 60% (polymer G).

EXAMPLE 1

The reactive silicon group-containing polyether oligomer (polymer A) obtained in Synthesis Example 1 and the copolymer (polymer E) obtained in Synthesis Example 3 were blended with each other in a solids ratio (by weight) of 60/40, and the volatile matter was removed by heating at 110° C. under reduced pressure using an evaporator to give a clear and viscous liquid with a solids concentration of not less than 99%. To 100 weight parts of this liquid were added 50 weight parts of surface-treated colloidal calcium carbonate (mean particle size: 0.08 µm; trademark: Hakuenka CCR; product of Shiraishi Kogyo), 3 weight parts of vinyltrimethoxysilane (trademark: A-171; product of Nippon Unicar) as a silicon compound, 2 weight parts of N-(β-aminoethyl)-γ-aminopropyltrimethoxysilane (trademark: A-1122; product of Nippon Unicar), and 2 weight parts of dibutyLtin diacetylacetonate (trademark: U-220; product of Nitto Kasei), followed by uniform blending to give a curable resin composition of the present invention.

EXAMPLE 2

A curable resin composition of the present invention was prepared in the same manner as in Example 1 except that the polyether oligomer obtained in Synthesis Example 1 (polymer A) was used as the reactive silicon group-containing polyether oligomer and the copolymer obtained in Synthesis Example 4 (polymer F) as the copolymer.

EXAMPLE 3

A curable resin composition of the present invention was prepared in the same manner as in Example 1 except that the polyether oligomer obtained in Synthesis Example 2 (polymer B) as the reactive silicon group-containing polyether oligomer and the copolymer obtained in Synthesis Example 3 (polymer E) as the copolymer.

EXAMPLE 4

A curable resin composition of the present invention was a prepared in the same manner as in Example 1 except that the polyether oligomer obtained in Synthesis Example 1 (polymer A) was used as the reactive silicon group-containing polyether oligomer and the copolymer obtained in Synthesis Example 4 (polymer G) as the copolymer. When polymer A and polymer G were blended together and the volatile matter was removed by heating at 110° C. under reduced pressure, a turbid, viscous liquid was obtained.

COMPARATIVE EXAMPLE 1

A curable resin composition of the present invention was prepared in the same manner as in Example 1 except that the polyether oligomer obtained in Comparative Synthesis Example 1 (polymer C) was used as the reactive silicon group-containing polyether oligomer and the copolymer obtained in Synthesis Example 3 (polymer E) as the copolymer.

COMPARATIVE EXAMPLE 2

A curable resin composition of the present invention was prepared in the same manner as the Example 1 except that the polyether oligomer obtained in Comparative Synthesis Example 1 (polymer C) was used as the reactive silicon group-containing polyether oligomer and the copolymer obtained in Synthesis Example 4 (polymer F) as the copolymer.

COMPARATIVE EXAMPLE 3

A curable composition of the present invention was prepared in the same manner as in Example 1 except that the polyether oligomer obtained in Comparative Synthesis Example 2 (polymer D) was used as the reactive silicon group-containing polyether oligomer and the copolymer obtained in Synthesis Example 3 (polymer E) as the copolymer.

COMPARATIVE EXAMPLE 4

A curable resin composition of the present invention was prepared in the same manner as in Example 1 except that the polyether oligomer obtained in Comparative Synthesis Example 1 (polymer C) was used as the reactive silicon group-containing polyether oligomer and the copolymer obtained in Synthesis Example 4 (polymer G) as the copolymer. When polymer C was blended with polymer G and the volatile matter was removed by heating at 110° C. under reduced pressure, a turbid, viscous liquid was obtained.

The physical properties of the cured products were measured in the following manner.

(1) Tack Development and Retention Periods and Tackiness

The contact adhesives prepared in Examples 1, 2, 3 and 4 and Comparative Examples 1, 2, 3 and 4 were each spread thinly over aluminum substrates and the time until tack development, tackiness and tack retention period (period from development to disappearance of tack) were determined by finger touch under the conditions of 23° C. and a humidity of 50%. The tackiness was evaluated according to the following criteria: Tackiness: ⊚ much stronger than, ○ almost comparable to, and Δ weaker than the tack of the curable resin composition of Comparative Example 1.

(2) Shear Strength

For tensile shear strength measurements, JIS H 4000 aluminum sheets A-1050P (100×25×2 mm test specimens) were used according to JIS K 6850. Each of the above curable resin compositions was thinly spread over the specimens using a spatula. After 5 minutes, the test specimens were laminated together and pressure was applied to the assemblies by hand to give specimens for testing. These specimens were cured at 23° C. for 2 days and then further at 50° C. for 3 days and then subjected to tensile testing.

(3) Peel Strength

For T-peel strength measurements, JIS H 4000 aluminum sheets A-1050P (200×25×0.1 mm test specimens) were used accordingly to JIS K 6854. Each of the above curable resin compositions was thinly spread over the specimens using a spatula and, 5 minutes later, the test specimens were laminated together and pressure was applied using a hand roller to give test specimens. Each test specimen was cured at 23° C. for 2 days and further at 50° C. for 3 days and then subjected to tensile testing.

The measurement results are shown in Table 1.

TABLE 1

| | | Example | | | | Comparative Example | | | |
|---|---|---|---|---|---|---|---|---|---|
| | | 1 | 2 | 3 | 4 | 1 | 2 | 3 | 4 |
| Polyether oligomer | | A | A | B | A | C | C | D | C |
| Copolymer | | E | F | E | G | E | F | E | G |
| Tack Time until development | min. | 15 | 15 | 20 | 15 | 10 | 10 | 15 | 10 |
| Tackiness | | ○ | ○ | ⊚ | ○ | ○ | ○ | Δ | ○ |
| Retention period | min. | 120 | 120 | 180 | 120 | 50 | 50 | 120 | 45 |
| Sheer strength | MPa | 8.80 | 9.13 | 10.6 | 6.10 | 8.83 | 8.80 | 5.20 | 5.95 |
| Peel strength | N/25 mm | 62 | 76 | 115 | 55 | 63 | 62 | 43 | 52 |

From the data shown in Table 1, it is evident that the time until tack development is short in Comparative Examples 1, 2 and 4 representing the prior art and that, as seen in those examples, adjustment to prolong the tack retention period results in reduced tackiness and bond strength as shown in Comparative Example 3. On the contrary, in Examples 1, 2 and 4, the tack retention period could be prolonged while maintaining the same physical properties as those attainable in the prior art. In Example 3, the physical properties and tack retention time were further improved by using a higher molecular weight polyether oligomer as component (I).

What is claimed is:

1. A curable resin composition which comprises (I) a reactive silicon group-containing polyether oligomer, (II) a copolymer comprising a molecular chain substantially composed of one or more acrylate ester monomer units and/or methacrylate ester monomer units and (III) an accelerator, said reactive silicon group-containing polyether oligomer having, within the molecule thereof, a partial structure represented by the general formula (1):

$$—O—R^1—CH(R^2)—CH_2—(Si(R^3{}_{2-b})(X_b)O)_m Si(R^4{}_{3-a})X_a \quad (1)$$

wherein $R^1$ represents a divalent organic group of 1 to 20 carbon atoms containing at least one constituent element selected from the group consisting of hydrogen, oxygen and nitrogen, $R^2$ represents an alkyl group of 1 to 10 carbon atoms, $R^3$ and $R^4$ may be the same or different and each represents an alkyl group of 1 to 20 carbon atoms, an aryl group of 6 to 20 carbon atoms or an aralky) group of 7 to 20 carbon atoms or a triorganosiloxy group of the formula $(R')_3SiO—$, in which R' is a monovalent hydrocarbon group of 1 to 20 carbon atoms and the three R' groups may be the same or different, and where there are two or more $R^3$ or $R^4$ groups, they may be the same or different; X represents a hydroxyl group or hydrolyzable group and, where there are two or more X groups, they may be the same or different; a represents 0, 1, 2 or 3, b represents 0, 1 or 2, m represents an integer of 0 to 19, and the b's in the m $—(Si(R^3{}_{2-b})(X_b)—O)—$ groups may be the same or different, provided that the condition $a+\Sigma b \geqq 1$ is satisfied;

wherein said component (I) is obtained by reacting a polyether oligomer having an unsaturated bond introduced therein of the general formula (2):

$$—O—R^1—C(CH_3)=CH_2 \quad (2)$$

wherein $R^1$ is as defined above, with a reactive silicon group-containing compound represented by the general formula (3):

$$H—(Si(R^3{}_{2-b})(X_b)—O)_m Si(R^4{}_{3-a})X_a \quad (3)$$

wherein $R^3$, $R^4$, a, b, m and X are as defined above, in an oxygen-containing atmosphere in the presence of a catalyst and elemental sulfur.

2. The curable resin composition according to claim 1, wherein $R^1$ in component (I) is $CH_2$.

3. The curable resin composition according to claim 1, wherein $R^2$ in component (I) is $CH_3$.

4. The curable resin composition according to claim 1, wherein component (I) is a reactive silicon group-containing polyether oligomer having a partial structure represented by the formula:

$$—O—CH_2—CH(CH_3)—CH_2—Si(CH_3)(OCH_3)_2$$

5. The curable resin composition according to claim 1, wherein component (I) is a reactive silicon group-containing polyether oligomer having a partial structure represented by the formula:

$$—O—CH_2—CH(CH_3)—CH_2—Si(CH_3)(OCH_3)_2$$

as obtained by reacting a polyether oligomer having an unsaturated bond introduced therein of the formula:

$$—O—CH_2—C(CH_3)=CH_2$$

with a reactive silicon group-containing compound of the formula:

$$H—Si(CH_3)(OCH_3)_2$$

in an oxygen-containing atmosphere in the presence of a catalyst and elemental sulfur.

6. The curable resin composition according to claim 1, wherein component (II) is a copolymer comprising a molecular chain substantially composed of (a) acrylic and/or methacrylic ester monomer units having a hydrocarbon group of 1 to 8 carbon atoms, and (b) acrylic and/or methacrylic ester monomer units having a hydrocarbon group of 10 or more carbon atoms.

7. The curable resin composition according to claim 1, wherein component (II) is a copolymer having a silicon group crosslinkable under siloxane bond formation.

8. The curable resin composition according to claim 2, wherein $R^2$ in component (I) is $CH_3$.

9. The curable resin composition according to claim 2, wherein component (H) is a copolymer comprising a molecular chain substantially composed of (a) acrylic and/or methacrylic ester monomer units having a hydrocarbon group of 1 to 8 carbon atoms, and (b) acrylic and/or methacrylic ester monomer units having a hydrocarbon group of 10 or more carbon atoms.

10. The curable resin composition according to claim 3, wherein component (II) is a copolymer comprising a molecular chain substantially composed of (a) acrylic and/or methacrylic ester monomer units having a hydrocarbon group of 1 to 8 carbon atoms, and (b) acrylic and/or methacrylic ester monomer units having a hydrocarbon group of 10 or more carbon atoms.

11. The curable resin composition according to claim 4, wherein component (II) is a copolymer comprising a molecular chain substantially composed of (a) acrylic and/or methacrylic ester monomer units having a hydrocarbon group of 1 to 8 carbon atoms, and (b) acrylic and/or methacrylic ester monomer units having a hydrocarbon group of 10 or more carbon atoms.

12. The curable resin composition according to claim 2, wherein component (II) is a copolymer having a silicon group crosslinkable under siloxane bond formation.

13. The curable resin composition according to claim 3, wherein component (II) is a copolymer having a silicon group crosslinkable under siloxane bond formation.

14. The curable resin composition according to claim 4, wherein component (II) is a copolymer having a silicon group crosslinkable under siloxane bond formation.

15. The curable resin composition according to claim 6, wherein component (II) is a copolymer having a silicon group crosslinkable under siloxane bond formation.

16. A method of adhesion of an adherend, which comprises applying a curable resin composition to said adherend, allowed it to stand in the air to develop tack in the adhesive layer, and conducting adhesion of said adherends during the tack is retained in the adhesive layer, wherein said curable resin composition comprises (I) a reactive silicon group-containing polyether oligomer, (II) a copolymer comprising a molecular chain substantially composed of one or more acrylate ester monomer units and/or methacrylate ester monomer units and (III) an accelerator, said reactive silicon group-containing polyether oligomer having, within the molecule thereof, a partial structure represented by the general formula (1):

$$\text{—O—R}^1\text{—CH(R}^2\text{)—CH}_2\text{—(Si(R}^3{}_{2-b})(X_b)O)_m\text{Si(R}^4{}_{3-a})X_a \quad (1)$$

wherein $R^1$ represents a divalent organic group of 1 to 20 carbon atoms containing at least one constituent element selected from the group consisting of hydrogen, oxygen and nitrogen, $R^2$ represents an alkyl group of 1 to 10 carbon atoms, $R^3$ and $R^4$ may be the same or different and each represents an alkyl group of 1 to 20 carbon atoms, an aryl group of 6 to 20 carbon atoms or an aralkyl group of 7 to 20 carbon atoms or a triorganosiloxy group of the formulas $(R')_3SiO\text{—}$, in which R' is a monovalent hydrocarbon group of 1 to 20 carbon atoms and the three R' groups may be the same or different, and where there are two or more $R^3$ or $R^4$ groups, they may be the same or different; X represents a hydroxyl group or a hydrolyzable group and, where there are two or more X Groups, they may be the same or different; a represents 0, 1, 2 or 3, b represents 0, 1 or 2, m represents an integer of 0 to 19, and the b's in the m $\text{—(Si(R}^3{}_{2-b})(X_b)\text{—O)—}$ groups may b the same or different, provided that the condition $a+\Sigma b \geq 1$ is satisfied.

17. The method of adhesion according to claim 16, wherein component (I) is a reactive silicon group-containing polyether oligomer obtained by reacting a polyether oligomer having an unsaturated bond introduced therein of the general formula (2):

$$\text{—O—R}^1\text{—C(CH}_3\text{)=CH}_2 \quad (2)$$

wherein $R^1$ is as defined above, with a reactive silicon group-containing compound represented by the general formula (3):

$$\text{H—(Si(R}^3{}_{2-b})(X_b)O)_m\text{Si(R}^4{}_{3-a})X_a \quad (3)$$

wherein $R^3$, $R^4$, a, b, m and x are as defined above, in an oxygen-containing atmosphere in the presence of a catalyst and elemental sulfur.

* * * * *